United States Patent
Otani

(10) Patent No.: US 9,621,790 B2
(45) Date of Patent: Apr. 11, 2017

(54) IMAGING DEVICE, IMAGING METHOD AND STORAGE MEDIUM

(71) Applicant: CASIO COMPUTER CO., LTD., Tokyo (JP)

(72) Inventor: Daisuke Otani, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 182 days.

(21) Appl. No.: 13/735,520

(22) Filed: Jan. 7, 2013

(65) Prior Publication Data

US 2013/0182168 A1     Jul. 18, 2013

(30) Foreign Application Priority Data

Jan. 16, 2012  (JP) .................................. 2012-006110

(51) Int. Cl.
*H04N 5/232* (2006.01)

(52) U.S. Cl.
CPC .............................. *H04N 5/23216* (2013.01)

(58) Field of Classification Search
None
See application file for complete search history.

(56) References Cited

U.S. PATENT DOCUMENTS 5,253,081 A * 10/1993 Shoji et al. ................... 358/450
8,619,004 B2   12/2013 Choi 2002/0059227 A1 *  5/2002 Narahara ........................ 707/6
2002/0102014 A1 *  8/2002 Ozaki et al. ................... 382/132
2009/0002334 A1 *  1/2009 Karoji ............................ 345/173
2009/0051666 A1    2/2009 Choi et al.
2009/0316021 A1 * 12/2009 Nozaki ....................... 348/231.2
2010/0026643 A1 *  2/2010 Ozawa et al. ................ 345/173
2010/0110010 A1    5/2010 Choi
2010/0315529 A1 * 12/2010 Nakase ...................... 348/222.1

(Continued)

FOREIGN PATENT DOCUMENTS

JP     2001-036782 A     2/2001
JP     2005-318091 A    11/2005

(Continued)

OTHER PUBLICATIONS

Korean Office Action dated Apr. 4, 2014 in counterpart Korean Application No. 10-2013-0003855.

(Continued)

*Primary Examiner* — Roberto Velez
*Assistant Examiner* — Yih-Sien Kao
(74) *Attorney, Agent, or Firm* — Holtz, Holtz & Volek PC

(57) ABSTRACT

In the present invention, a control section determines the type of a touch operation performed on a touch panel during review display that is performed in a display section (monitor screen) for a predetermined amount of time after an image is captured by an imaging section, and performs type-specific processing according to the determined type on the image being review displayed. For example, when a slide operation is performed as a touch operation on the touch panel, the control section determines the slide direction as the type of the operation and performs type-specific processing based on the slide direction (direction-specific processing).

13 Claims, 15 Drawing Sheets

(56) References Cited

U.S. PATENT DOCUMENTS

2011/0267530 A1* 11/2011 Chun .................. G06F 3/04883
                                                          348/333.11
2013/0076936 A1*  3/2013 Yoshida .................... 348/222.1

FOREIGN PATENT DOCUMENTS

| JP | 2006-109137 A | 4/2006 |
|----|---------------|--------|
| JP | 2006-211458 A | 8/2006 |
| JP | 2007-318536 A | 12/2007 |
| JP | 2009-164755 A | 7/2009 |
| JP | 2010-055598 A | 3/2010 |
| JP | 2010-056884 A | 3/2010 |
| JP | 2010-166459 A | 7/2010 |
| JP | 2010-199681 A | 9/2010 |
| JP | 2012-010061 A | 1/2012 |
| KR | 10-2009-0013040 A | 2/2009 |

OTHER PUBLICATIONS

Korean Office Action dated Jan. 22, 2014 (and English translation thereof) in counterpart Korean Application No. 10-2013-0003855.
Japanese Office Action dated Nov. 18, 2013 (and English translation thereof) in counterpart Japanese Application No. 2012-006110.

* cited by examiner

FIG.2A
SLIDE OPERATION
SLIDE OPERATION
IN UPWARD
DIRECTION
SLIDE OPERATION
IN LEFTWARD
DIRECTION
REVIEW DISPLAY
SLIDE OPERATION
IN RIGHTWARD
DIRECTION
SLIDE OPERATION
IN DOWNWARD
DIRECTION
FIG.2B
HANDWRITTEN CHARACTER INPUT OPERATION
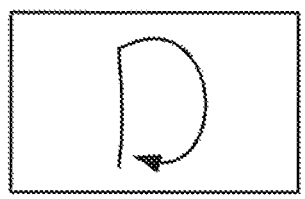

FIG. 3

T1 IMAGING MODE DIRECTION TABLE

| DIRECTION | SETTING TYPE | |
|---|---|---|
| | SORT | SORT + DELETE |
| UP | SORT (COPY) INTO FOLDER A<br>FOLDER A RENAMING | SORT INTO FOLDER A<br>FOLDER A RENAMING |
| DOWN | SORT (COPY) INTO FOLDER B<br>FOLDER B RENAMING | DELETE |
| LEFT | SORT (COPY) INTO FOLDER C<br>FOLDER C RENAMING | SORT INTO FOLDER B<br>FOLDER B RENAMING |
| RIGHT | SORT (COPY) INTO FOLDER D<br>FOLDER D RENAMING | SORT INTO FOLDER C<br>FOLDER C RENAMING |

| DIRECTION | SETTING TYPE | |
|---|---|---|
| | SAVE SIZE OF IMAGE | FILE ATTRIBUTES |
| UP | FOR A3 PRINTING | SECRET |
| DOWN | FOR A4 PRINTING | READ-ONLY |
| LEFT | FOR DISPLAY | NONE |
| RIGHT | FOR MAIL ATTACHMENT | NONE |

FIG.4A

T2 IMAGING MODE HANDWRITTEN CHARACTER RECOGNITION TABLE

| RECOGNIZED CHARACTER | SETTING |
|---|---|
| D | DELETE |
| S | SECRET |
| R | READ-ONLY |
| A | FOR A3 PRINTING |
| B | FOR A4 PRINTING |
| C | FOR DISPLAY |
| M | FOR MAIL ATTACHMENT |
| OTHER | SORT (COPY) INTO CORRESPONDING FOLDER CORRESPONDING FOLDER RENAMING |

FIG.4B

T3 PLAYBACK MODE DIRECTION TABLE

| DIRECTION | SETTING |
|---|---|
| LEFT | BACK TO PRECEDING IMAGE |
| RIGHT | FORWARD TO NEXT IMAGE |

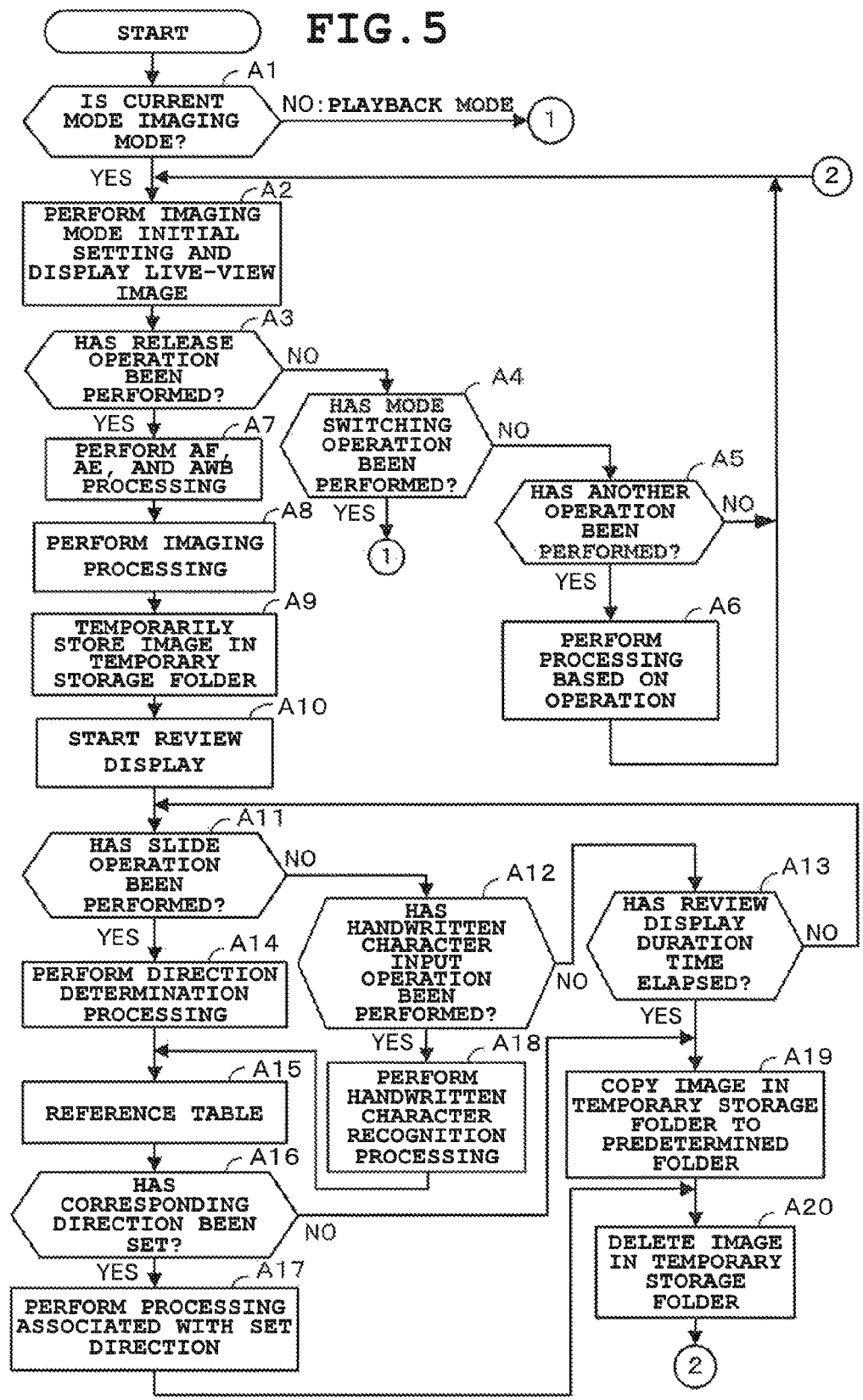

DIRECTION SPECIFYING OPERATION

HANDWRITTEN CHARACTER INPUT OPERATION

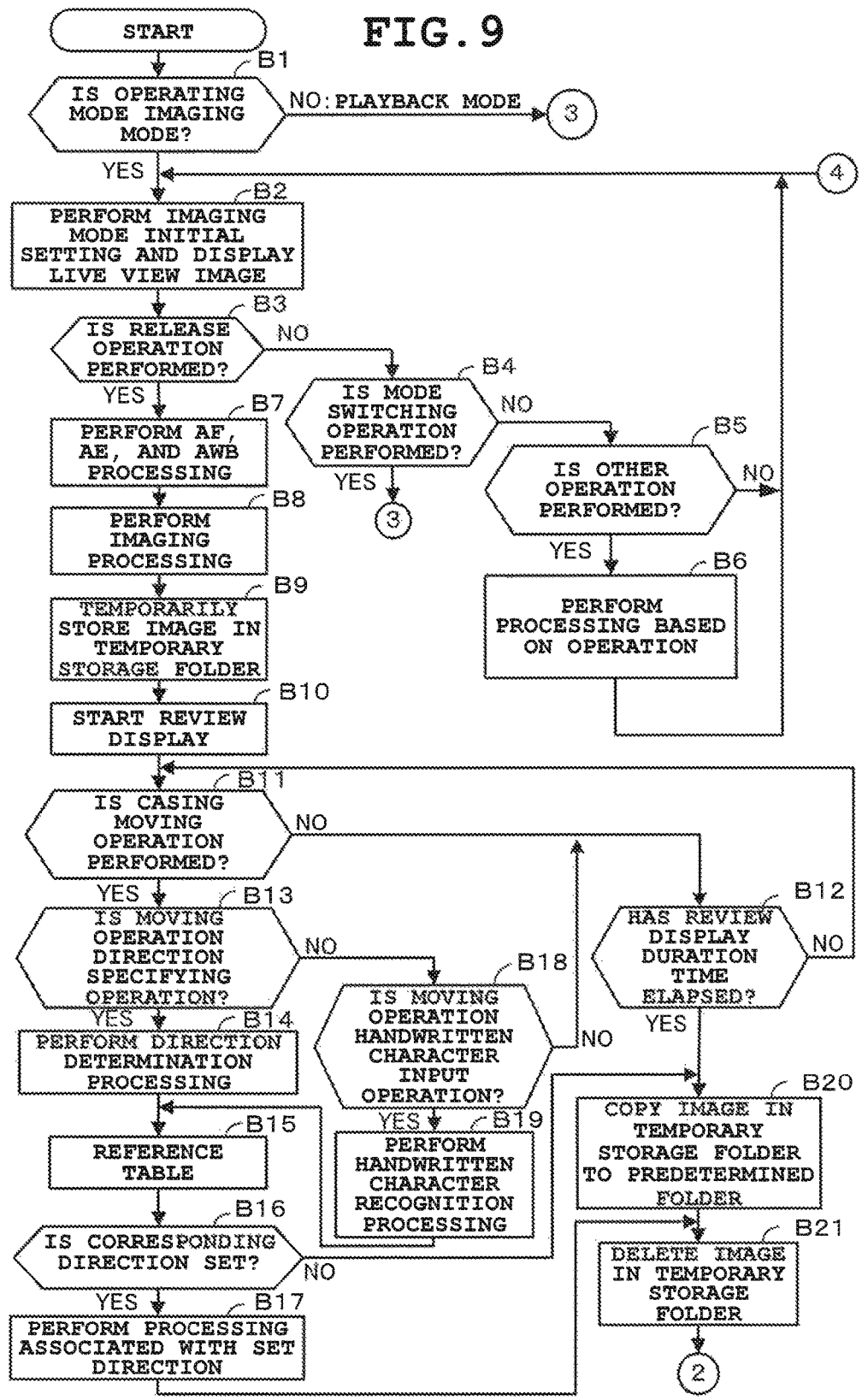

FIG. 12A
WHEN SUBJECT IS MOVED (HAND IS WAVED) IN
FRONT OF IMAGING SECTION
WHEN DIRECTION SPECIFYING
OPERATION IS PERFORMED
WAVING OPERATION IN　　　　WAVING OPERATION IN
RIGHTWARD DIRECTION　　　　 LEFTWARD DIRECTION
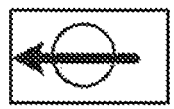    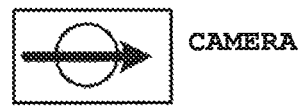
WAVING OPERATION IN　　　　WAVING OPERATION IN
UPWARD DIRECTION　　　　　 DOWNWARD DIRECTION
    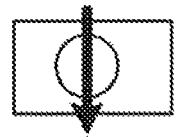
FIG. 12B
WHEN HANDWRITTEN CHARACTER
INPUT OPERATION IS PERFORMED
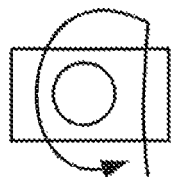

WHEN SUBJECT MOVES BY CASING BEING MOVED (WAVED)

WHEN DIRECTION SPECIFYING
OPERATION IS PERFORMED

WHEN HANDWRITTEN CHARACTER
INPUT OPERATION IS PERFORMED

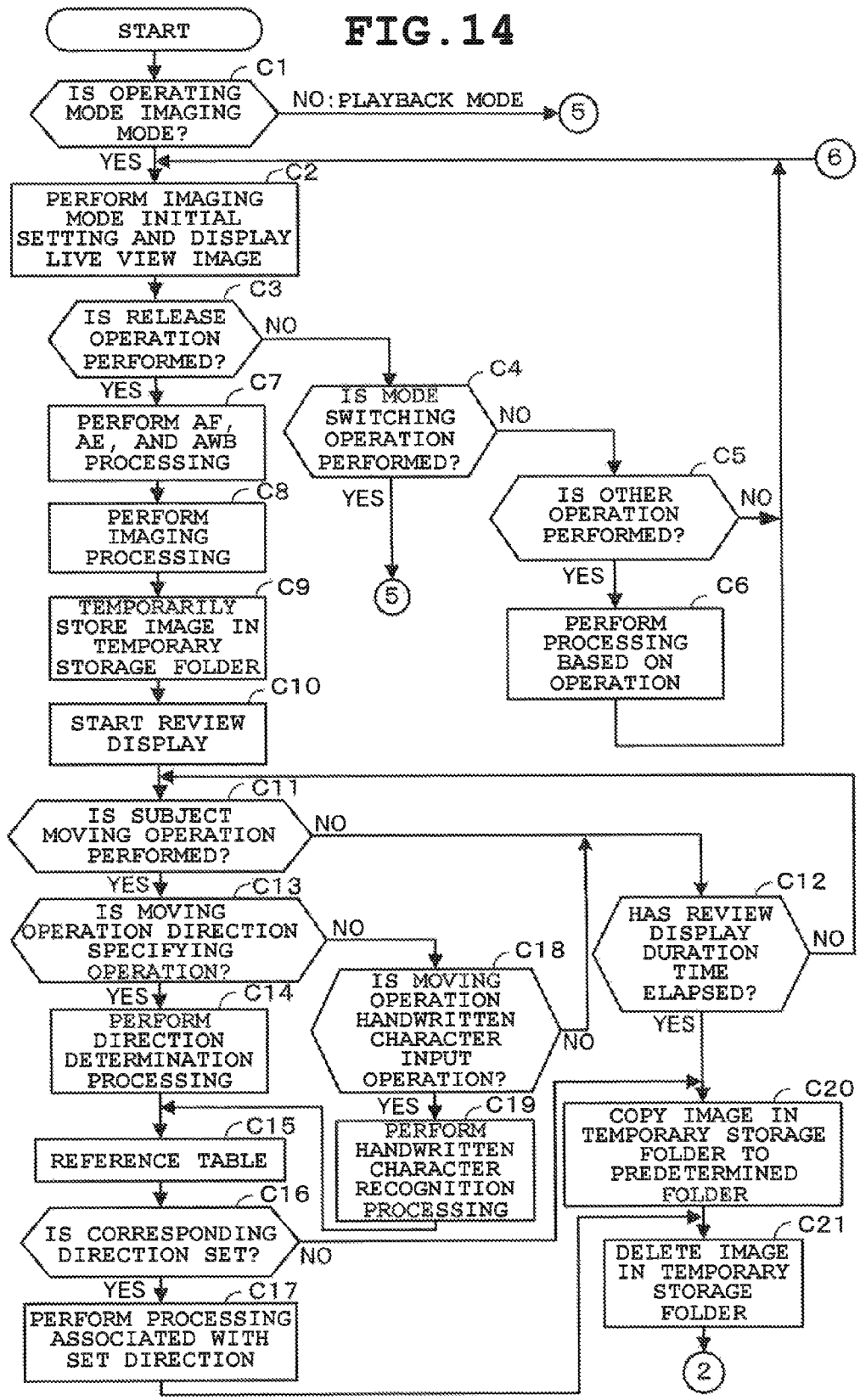

IMAGING DEVICE, IMAGING METHOD AND STORAGE MEDIUM

CROSS-REFERENCE TO RELATED APPLICATION

This application is based upon and claims the benefit of priority from the prior Japanese Patent Application No. 2011-006110, filed Jan. 16, 2012, the entire contents of which is incorporated herein by reference.

BACKGROUND OF THE INVENTION

1. Field of the Invention

The present invention relates to an imaging device including a monitor screen, an imaging method and a storage medium.

2. Description of the Related Art

Generally, when saving images captured by an imaging device such as a compact camera by sorting them into separate folders by subject, the photographer manually sorts the captured images while replaying them one at a time and checking a subject in each image. However, if several days have been elapsed since the image capturing date, the photographer may not be able to identify the photographic subjects or the shooting location, or may not remember the reasons for capturing these images. In addition, the photographer is required to perform a bothersome operation to specify the folder to save for each image. If the number of stored images is large, this operation becomes more complicated. Accordingly, there is a technology in which a captured image is analyzed and thereby automatically sorted into a folder corresponding to a pre-registered photographic subject (pattern), as described in Japanese Patent Application Laid-open (Kokai) Publication No. 2010-056884.

SUMMARY OF THE INVENTION

In accordance with one aspect of the present invention, there is provided an imaging device comprising: a monitor screen; a touch panel provided on the monitor screen; an imaging section which captures an image; a determining section which determines type of a touch operation performed on the touch panel, during review display that is processing for displaying the image on the monitor screen for a predetermined amount of time after the image is captured by the imaging section; and a processing control section which performs type-specific processing according to the type of the touch operation determined by the determining section on the image being review displayed.

In accordance with another aspect of the present invention, there is provided an imaging device comprising: a monitor screen; an imaging section which captures an image; a detecting section which detects a moving operation to move the imaging device, during review display that is processing for displaying the image on the monitor screen for a predetermined amount of time after the image is captured by the imaging section; a determining section which determines type of the moving operation detected by the detecting section; and a processing control section which performs type-specific processing according to the type of the moving operation determined by the determining section on the image being review displayed.

In accordance with another aspect of the present invention, there is provided an imaging device comprising: a monitor screen; an imaging section which captures an image; a detecting section which detects movement of a subject within the image acquired from the imaging section, during review display that is processing for displaying the image on the monitor screen for a predetermined amount of time after the image is captured by the imaging section; a determining section which determines type of a moving operation performed to move the subject, when the movement of the subject is detected by the detecting section; and a processing control section which performs type-specific processing according to the type of the moving operation determined by the determining section on the image being review displayed.

In accordance with another aspect of the present invention, there is provided an imaging method for an imaging device, comprising: a step of capturing an image; a step of determining type of a touch operation performed on a touch panel provided on a monitor screen, during review display that is processing for displaying the image on the monitor screen for a predetermined amount of time after the image is captured; and a step of performing type-specific processing according to the determined type of the touch operation on the image being review displayed.

In accordance with another aspect of the present invention, there is provided an imaging method for an imaging device, comprising: a step of capturing an image; a step of detecting a moving operation to move the imaging device, during review display that is processing for displaying the image on a monitor screen for a predetermined amount of time after the image is captured; a step of determining type of movement when the moving operation is detected; and a step of performing type-specific processing according to the determined type of the movement on the image being review displayed.

In accordance with another aspect of the present invention, there is provided an imaging method for an imaging device, comprising: a step of capturing an image; a step of detecting movement of a subject within the image captured and acquired, during review display that is processing for displaying the image on a monitor screen for a predetermined amount of time after the image is captured; a step of determining type of a moving operation performed to move the subject, when the movement of the subject is detected; and a step of performing type-specific processing according to the determined type of the moving operation on the image being review displayed.

In accordance with another aspect of the present invention, there is provided a non-transitory computer-readable storage medium having stored thereon a program that is executable by a computer, the program being executable by the computer to perform functions comprising: processing for capturing an image; processing for determining type of a touch operation performed on a touch panel provided on a monitor screen, during review display that is processing for displaying the image on the monitor screen for a predetermined amount of time after the image is captured; and processing for performing type-specific processing based on the determined type of the touch operation on the image being review displayed.

In accordance with another aspect of the present invention, there is provided a non-transitory computer-readable storage medium having stored thereon a program that is executable by a computer, the program being executable by the computer to perform functions comprising: processing for capturing an image; processing for detecting a moving operation to move an imaging device, during review display that is processing for displaying the image on a monitor screen for a predetermined amount of time after the image is captured; processing for determining type of movement when the moving operation is detected; and processing for performing type-specific processing according to the determined type of the movement on the image being review displayed.

In accordance with another aspect of the present invention, there is provided a non-transitory computer-readable storage medium having stored thereon a program that is executable by a computer, the program being executable by the computer to perform functions comprising: processing for capturing an image; processing for detecting movement of a subject within the image captured and acquired, during review display that is processing for displaying the image on a monitor screen for a predetermined amount of time after the image is captured; processing for determining type of a moving operation performed to move the subject, when the movement of the subject is detected; and processing for performing type-specific processing according to the determined type of the moving operation on the image being review displayed.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2A is a diagram showing the types of slide operations performed on a touch panel 8 in an imaging mode, and FIG. 2B is a diagram showing an example of a handwritten character input operation performed on the touch panel 8 in the imaging mode;

FIG. 3 is a diagram for describing an imaging mode direction table T1;

FIG. 4A is a diagram for describing an imaging mode handwritten character recognition table T2, and FIG. 4B is a diagram for describing a playback mode direction table T3;

FIG. 5 is a flowchart of the overall operation of the camera which is started when power is turned ON (a flowchart outlining operations of the characteristic portion of a first embodiment);

FIG. 9 is a flowchart of the overall operation of the camera which is started when power is turned ON (a flowchart outlining operations of the characteristic portion of the second embodiment);

FIG. 12A is a diagram showing the types of moving operations in which the photographer moves his or her hand (subject) in a predetermined direction in front of the imaging lens, and FIG. 12B is a diagram showing an example of a handwritten character input operation performed by the photographer moving his or her hand (subject) in front of the imaging lens;

FIG. 14 is a flowchart of the overall operation of the camera which is started when power is turned ON (a flowchart outlining operations of the characteristic portion of the third embodiment)

DETAILED DESCRIPTION OF THE PREFERRED EMBODIMENTS

Preferred embodiments of the present invention will hereinafter be described with reference to the drawings.

(First Embodiment)

First, a first embodiment of the present invention will be described with reference to FIG. 1 to FIG. 6.

Figure 1:
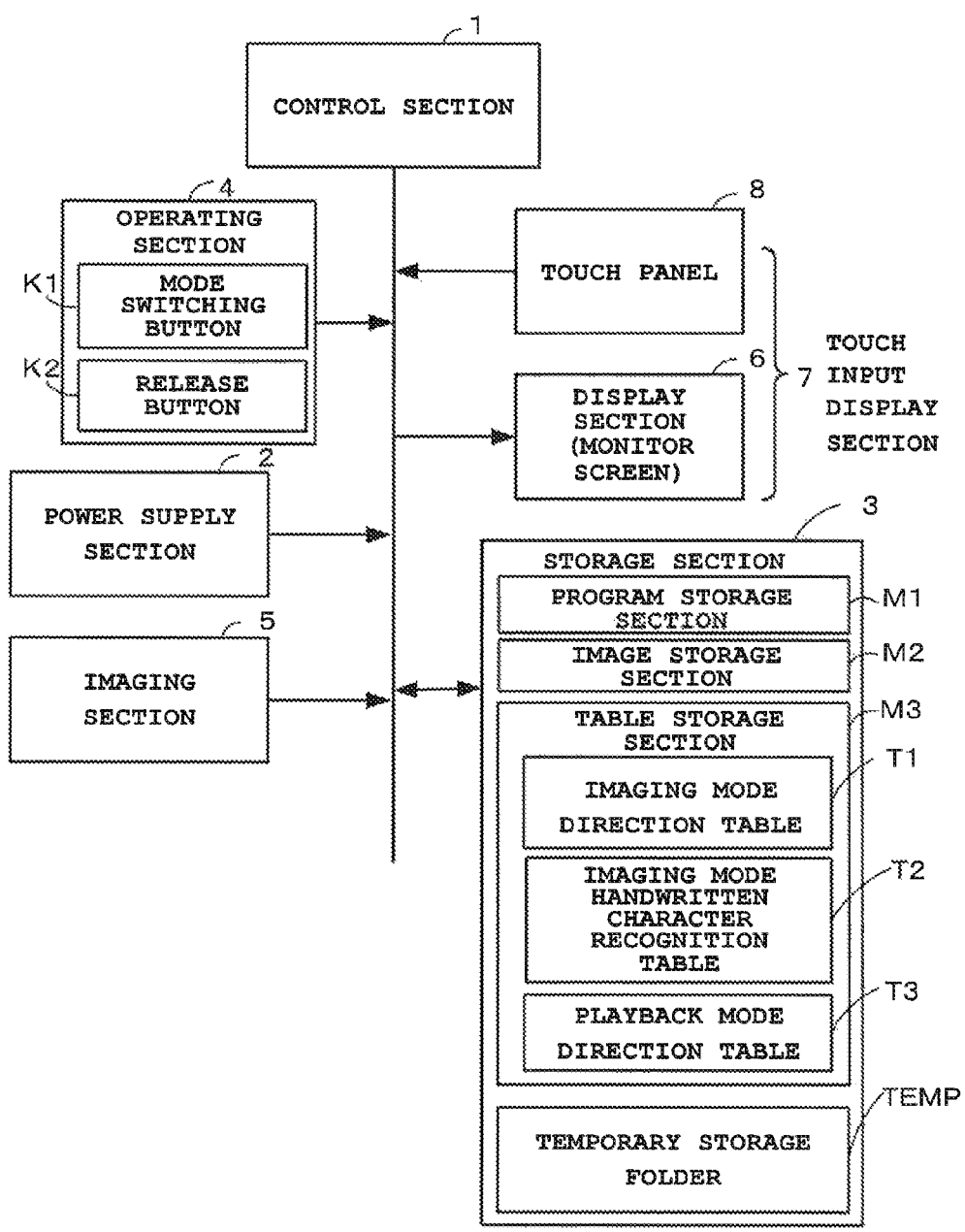
FIG. 1 is a block diagram showing basic components of a digital camera to which the present invention has been applied.

FIG. 1 is a block diagram showing basic components of a digital camera to which the present invention has been applied.

This digital camera (imaging device), which is a compact camera capable of capturing moving images in addition to still images and whose core is a control section 1, provides basic functions such as an imaging function and a clock function, a touch input function for enabling input by touch operations, and a character recognition function for recognizing a character inputted by touch operations. The control section 1, which operates by receiving power supply from a power supply section (secondary battery) 2, controls the overall operation of the digital camera (hereinafter referred to as camera) in accordance with various programs stored in a storage section 3. This control section 1 is provided with a Central Processing Unit (CPU), a memory, and the like (not shown).

The storage section 3 is configured to include a Read-Only Memory (ROM) or a flash memory, and has a program storage section M1, an image storage section M2, and a table storage section M3. The program storage section M1 stores programs for actualizing the first embodiment according to operation procedures shown in FIG. 5 and FIG. 6 described hereafter, various applications, etc. The image storage section M2 sorts and stores captured images (still images and moving images) in folder units. The table storage section M3 stores various tables. The storage section 13 also includes a work area that temporarily stores various information (such as a captured image, a flag, and a timer) required to operate the camera.

A temporary storage folder TEMP provided in the work area of the storage section 3 temporarily stores an image immediately after being captured. The table storage section M3 is provided with an imaging mode direction table T1, an imaging mode handwritten character recognition table T2 and a playback mode direction table T3, described hereafter. Note that the storage section 3 may be configured to include a detachable, portable memory (recording medium) such as a Secure Digital (SD) card or an Integrated Circuit (IC) card, or may include a storage area on a predetermined external server side in a case where the camera is connected to a network by a communication function (not shown).

An operating section 4 of the camera includes various push-button keys for performing a setting operation for imaging conditions such as exposure and shutter speed, and an image selecting operation for selecting an image to be replayed (not shown), in addition to a mode switching button K1 and a release button K2. The mode switching button K1 is used to switch between an operation mode (imaging mode) in which image capturing is performed and an operation mode (playback mode) in which a captured image (stored image) is replayed. The release button K2 is used to give an instruction to start image capturing. The control section 1 performs mode switching processing, imaging processing, imaging condition setting, image selection processing and the like as processing based on input operation signals from the operating section 4.

An imaging section 5 of the camera constitutes a camera section capable of capturing a high-definition image of a subject by forming an image of the subject from an optical lens (not shown) in an image sensor (such as a Charge-Coupled Device [CCD] or a Complementary Metal Oxide Semiconductor [CMOS]). This imaging section 5, which is capable of capturing still images and moving images, performs color separation, gain adjustment for each RGB (Red Green Blue) color component, and the like on photoelectrically converted image signals (analog value signals), and after converting the image signals to digital value data, performs color interpolation processing (de-mosaic processing) on the digitalized image data, and displays the image data in full-color on a display section 6. The imaging section 5 is also capable of performing Auto Focus processing (AF processing), Auto Exposure adjustment processing (AE processing), Auto White Balance adjustment processing (AWB processing), image compression processing, image reconstruction processing, etc.

The display section 6 constituting a touch input display section 7 is, for example, a High Definition Liquid Crystal Display (HD LCD) or an organic Electroluminescent (EL) display having a screen where the aspect ratio (4:3 [width to height]) differs, and functions as a monitor screen that displays a captured image and as a playback screen on which a captured image is replayed. The touch input display section 7 constitutes a touch screen where a point on which a touch operation has been performed by a user's finger or the like is detected and the coordinate data of the detected point is inputted. This touch input display section 7 is structured by a transparent touch panel (touch sensor) 8 being arranged to be layered over the overall surface of the display section 6. Among various methods such as a capacitance method, a resistive-film method, an electromagnetic-induction method, and a piezoelectric method, the capacitance method which has excellent lightweightness, light transmission, durability, and the like has been adopted in this touch panel 8. However, the other methods may be used.

In the first embodiment, after an image is captured by the imaging section 5, the control section 1 continuously displays the image on the display section (monitor screen) 6 for a predetermined amount of time (such as five seconds), as an image for checking (hereinafter referred to as review display). Then, when a predetermined touch operation is performed on the touch panel 8 during the review display, or in other words, when a "slide operation" in which a user touches the touch panel 8 with a finger or the like and moves it on the touch panel 8 is performed, the control section 1 determines the type of the slide operation and performs type-specific processing based on the determined type on the image being review displayed (processing according to each direction, which is hereinafter referred to as "direction-specific processing"). Also, when a handwritten character input operation is performed on the touch panel 8 during the review display, the control section 1 recognizes the handwritten character inputted by the character input operation and performs type-specific processing based on the recognized character on the image being review displayed (processing according to each character, which is hereinafter referred to as "character-specific processing").

Note that the "type-specific processing" herein refers to processing according to each type including the direction-specific processing and the character-specific processing, and the "image being review displayed" refers to an image being displayed during review.

FIG. 2A is a diagram showing the types of predetermined slide operations performed on the touch panel 8 in the imaging mode.

Specifically, FIG. 2A shows examples in which the direction of a predetermined slide operation (slide direction: movement direction) performed when an image is being continuously review displayed for a predetermined amount of time after the image is captured by the imaging section 5 is the upward direction, the downward direction, the rightward direction, and the leftward direction. In the first embodiment, slide operations in the upward, downward, leftward, and rightward directions are enabled. FIG. 2B is a diagram showing an example in which a handwritten character input operation has been performed on the touch panel 8 in the imaging mode. In the example, the letter "D" has been inputted.

FIG. 3 is a diagram for describing the imaging mode direction table T1.

The imaging mode direction table T1 stores the type-specific processing (direction-specific processing) which is performed based on the type (slide direction) of a slide operation performed on the touch panel 8 in the imaging mode. This type-specific processing (direction-specific processing) is set in association with slide directions. "Direction" in FIG. 3 indicates the directions "up", "down", "left", and "right" as slide directions, and "setting type" indicates what type of type-specific processing is performed in accordance with the type (slide direction) of a slide operation. In the example in FIG. 3, "sort", "sort delete", "saved image size", and "file attributes" have been provided as the "setting type", and the "setting type" to be enabled can be arbitrarily selected by a user operation from among these setting types.

"Sort" in the "setting type" is image sorting processing in which a classification-specific folder (folder according to classification) is indicated into which an image being review displayed is sorted based on a slide direction when the image is saved. For example, when the slide direction is "up", processing for sorting (copying) the image into folder A, and folder A renaming processing for changing the file name of the image are performed. Similarly, when the slide direction is "down", processing for sorting (copying) the image into folder B, and folder B renaming processing for changing the file name of the image are performed. When the slide direction is "left", processing for sorting (copying) the image into folder C, and folder C renaming processing for changing the file name of the image are performed. When the slide direction is "right", processing for sorting (copying) the image into folder D, and folder D renaming processing for changing the file name of the image are performed.

The classification-specific folders are, for example, folders that store images according to their subject types, such as nature, people, family, and buildings, or folders that store images according to the events in which the images have been captured, such as New Year's and summer festivals. For example, the classification-specific folders may be used such that folder A stores images of family, folder B stores images of friends, and folder C stores images of scenery. Note that the contents of the imaging mode direction table T1 can be arbitrarily set by a user operation (the same applies hereafter).

"Sort+delete" in the "setting type" is image sorting processing in which a folder is indicated into which a review displayed image is sorted, as in the case of the above-described "sort". However, in addition to sorting an image into a folder, "sort+delete" includes deletion processing for giving an instruction to delete a review displayed image without saving it. In the case of the example in FIG. 3, when the slide direction is "up", the processing for sorting (copying) the image into folder A, and the folder A renaming processing for changing the file name of the image are performed. When the slide direction is "down", the deletion processing is performed in which the review displayed image is deleted without being saved. When the slide direction is "left", the processing for sorting (copying) the image into folder B, and the folder B renaming processing for changing the file name of the image are performed. When the slide direction is "right", the processing for sorting (copying) the image into folder C, and the folder C renaming processing for changing the file name of the image are performed.

"Save size of image" in the "setting type" is save-size changing processing in which the save size of an image being review displayed is indicated based on a slide direction when the image is saved. In the case of the example in FIG. 3, when the slide direction is "up", the save size is changed to "for A3 printing". When the slide direction is "down", the save size is changed to "for A4 printing". When the slide direction is "left", the save size is changed to "for display". When the slide direction is "right", the save size is changed to "for mail attachment". "File attributes" in the "setting type" is attribute adding processing in which a file attribute to be added to an image being review displayed is indicated based on a slide direction when the image is saved. In the case of the example in FIG. 3, when the slide direction is "up", "secret" is added that prompts password input for viewing. When the slide direction is "down", "read-only" is added that prohibits image editing. When the slide direction is "left" or "right", "none" is indicated (no file attributes are added).

FIG. 4A is a diagram for describing the imaging mode handwritten character recognition table T2.

The imaging mode handwritten character recognition table T2 stores the type-specific processing (character-specific processing) which is performed based on a handwritten character inputted by a character input operation when the handwritten character input operation is performed on the touch panel 8 in the imaging mode. This type-specific processing is set in association with handwritten character recognition results (recognized characters). In this instance, "delete" has been set in association with the recognized character "D". Note that the "delete" indicates that an image being review displayed should be deleted without being saved.

Also, the file attribute "secret" has been set in association with the letter "S", and the file attribute "read-only" has been set in association with the letter "R". In addition, the save size "for A3 printing" has been set in association with the letter "A", and the save size "for A4 printing" has been set in association with the letter "B". Moreover, the save size "for display" has been set in association with the letter "C", and the save size "for mail attachment" has been set in association with the letter "M". Processing for sorting (copying) the image into a corresponding folder, and folder renaming processing for changing the file name of the image have been set in association with "other" recognized characters, as in the case of the "sort". Note that the contents of the imaging mode handwritten character recognition table T2 can be arbitrarily set by a user operation.

FIG. 4B is a diagram for describing the playback mode direction table T3.

The playback mode direction table T3 stores processing that is performed based on a slide direction when a slide operation is performed on the touch panel 8 in the playback mode. When the slide direction is "left", processing for going back to the preceding image from the currently replayed image is performed. In addition, when the slide direction is "right", processing for forwarding to the following image (next image) from the currently replayed image is performed. Note that the contents of the playback mode direction table T3 can be arbitrarily set by a user operation.

Next, the operational concept of the camera according to the first embodiment will be described with reference to the flowcharts in FIG. 5 and FIG. 6. Here, each function described in the flowcharts is stored in a readable program code format as in the case of the first embodiment, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This is also the same in other embodiments described later.

Figure 6:
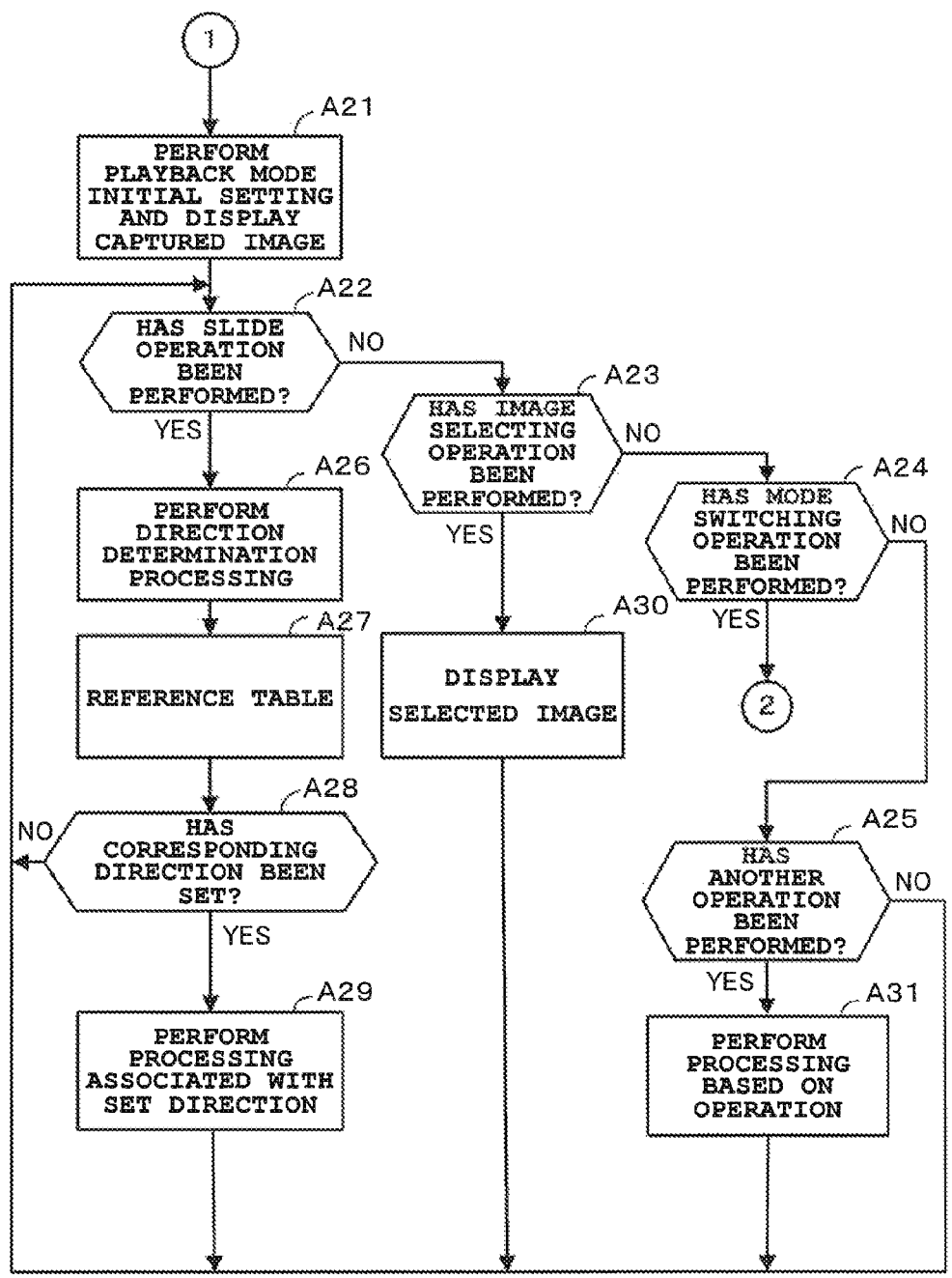
FIG. 6 is a flowchart of operations following those in FIG. 5.

FIG. 5 and FIG. 6 are flowcharts of the overall operation of the camera which is started when power is turned ON and outline operations of the characteristic portion of the first embodiment.

First, the control section 1 judges whether or not the current mode is the imaging mode (Step A1 in FIG. 5). When judged that the current mode is the imaging mode (YES at Step A1), the control section 1 proceeds to processing for the imaging mode. Conversely, when judged that the current mode is not the imaging mode (NO at Step A1), the control section 1 judges that the current mode is the playback mode, and therefore proceeds to the flow in FIG. 6 to perform processing for the playback mode. That is, the control section 1 performs initial setting for setting the camera in a state enabling the operations of the playback mode. Then, the control section 1 reads out from the image storage section M2 an image to be replayed (captured image) which has been arbitrarily specified by a user operation, and performs processing to display the image on the display section 6 (Step A21 in FIG. 6). In the playback mode, the control section 1 judges whether or not a slide operation has been performed on the touch panel 8 (Step A22), whether or not an operation for selecting an image to be replayed has been performed (Step A23), whether or not the mode switching button K1 has been operated (Step A24), and whether or not another operation has been performed (Step A25).

When judged that a slide operation has been detected based on a position detection signal from the touch panel 8 (YES at Step A22), the control section 1 determines the slide direction (Step A26). Subsequently, the control section 1 references the playback mode direction table T3 based on the determined direction (Step A27), and judges whether or not a corresponding direction has been set in the table T3 (Step A28). When judged that the slide direction corresponds to the leftward or rightward direction (YES at Step A28), the control section 1 performs processing associated with the corresponding direction (Step A29). For example, when the slide direction is "left", processing for going back to the preceding image from the currently replayed image is performed. When the slide direction is "right", processing for forwarding to the following image (next image) from the currently replayed image is performed. Then, the control section 1 returns to above-described Step A22.

At Step A23, when judged that an operation for selecting an image to be replayed has been performed in the playback mode (YES at Step A23), the control section 1 reads out the selected image from the image storage section M2, and after displaying the image on the display section 6 of the touch input display section 7 (Step A30), returns to above-described Step A22. At Step A25, when judged that an image scrolling operation, an image editing instruction operation, an enlargement instruction operation, or the like has been performed as another operation (YES at Step A25), the control section 1 performs processing such as image editing or image enlarging as processing based on the operation (Step A31), and returns to above-described Step A22. At Step A24, when judged that the mode switching button K1 has been performed for cancelling the playback mode and specifying the imaging mode (YES at Step A24), the control section 1 proceeds to the flow in FIG. 5 and performs the processing of the imaging mode (Step A2 to Step A20).

First, the control section 1 performs initial setting for setting the camera in a state enabling the operation of the imaging mode, and performs processing to display an image loaded from the imaging section 5 as a live-view image on the display section 6 (Step A2). In the imaging mode, the control section 1 judges whether or not the release button K2 has been operated (Step A3), whether or not the mode switching button K1 has been operated (Step A4), and whether or not another operation has been performed (Step A5). When judged that a setting operation for the imaging mode direction table T1, the imaging mode handwritten character recognition table T2, or the playback mode direction table T3, exposure setting, zoom setting, or the like has been performed as another operation (YES at Step A5), the control section 1 performs table setting processing, exposure setting, zoom setting, or the like as processing based on this operation (Step A6), and returns to above-described Step A2. Also, when judged that the mode switching button K1 has been performed for canceling the imaging mode and specifying the playback mode (YES at Step A4), the control section 1 proceeds to the above-described processing in the playback mode.

When judged that the release button K2 has been operated (YES at Step A3), the control section 1 performs AF processing, AE processing, and AWB processing (Step A7), and then sets imaging conditions and performs imaging processing (Step A8) with the image being live-view displayed on the display section 6 as an image to be captured. Next, the control section 1 temporarily stores the captured image in the temporary storage folder TEMP (Step A9), and starts review display that is continued for a predetermined amount of time after the imaging, by displaying the captured image on the display section (monitor screen) 6 as a check image (Step A10). During the review display, the control section 1 judges whether or not a slide operation has been performed on the touch panel 8 (Step A11), whether or not a handwritten character input operation has been performed on the touch panel 8 (Step A12), and whether or not the duration time of the review display has elapsed (Step A13).

When judged that a slide operation has been detected based on a position detection signal from the touch panel 8 (YES at Step A11), the control section 1 determines the slide direction (Step A14). Subsequently, the control section 1 references the imaging mode direction table T1 based on the determined direction (Step A15), and judges whether or not a corresponding direction has been set in the table T1 (Step A16). When judged that the slide direction does not correspond to any of the upward, downward, leftward, and rightward directions (NO at Step A16), the control section 1 proceeds to Step A19 and performs ordinary image storage processing.

That is, as ordinary processing that is performed in place of the type-specific processing (direction-specific processing and character-specific processing), the control section 1 performs processing to store the image in a predetermined folder (ordinary folder) in the image storage section M2. In this processing, the control section 1 copies the image temporarily stored in the temporary storage folder TEMP to the predetermined folder (ordinary folder) in the image storage section M2, and after deleting the image in the temporary storage folder TEMP as a processed image (Step A20), returns to above-described Step A2. Please note that the predetermined folder (ordinary folder) herein refers to, for example, a folder that stores images in the order of their captured dates without storing them by category. However, it is not limited to the folder that stores images in the order of their captured dates and may be a folder that stores images in the order of their file names (alphabetical order).

At Step A16, when judged that the slide direction corresponds to one of the upward, downward, leftward, and rightward directions (YES at Step A16), the control section 1 performs the type-specific processing (direction-specific processing) associated with the corresponding direction (Step A17). For example, when the "sort" in the "setting type" is active and the slide direction is "up", the processing for sorting (copying) the image into folder A, and the folder A renaming processing for changing the file name of the image are performed. When the "sort+delete" is active and the slide direction is "down", the review displayed image is deleted without being saved. When the "save size of image" is active and the slide direction is "up", the size of the review displayed image is changed to "for A3 printing" size. When the "file attributes" is active and the slide direction is "down", processing related to read-only which prohibits image editing is performed. After performing direction-specific processing such as those described above, the control section 1 deletes the image in the temporary storage folder TEMP as a processed image (Step A20), and returns to above-described Step A2.

At Step A12, when judged that a handwritten character input operation has been performed on the touch panel 8 in the imaging mode (YES at Step A12), the control section 1 performs processing to recognize a handwritten character inputted by the character input operation (Step A18). Then, when the handwritten character is recognized, the control section 1 references the imaging mode handwritten character recognition table T2 based on the recognized character (Step A15) and judges whether or not the recognized character corresponds to any one of the characters set in the table T2 (Step A16). When judged that the recognized character does not correspond to any of the characters (NO at Step A16), the control section 1 proceeds to Step A19 and copies the image temporarily stored in the temporary storage folder TEMP to the predetermined folder (ordinary folder) in the image storage section M2. Then, the control section 1 deletes the image in the temporary storage folder TEMP as a processed image (Step A20) and returns to above-described Step A2.

Conversely, when judged that the recognized character corresponds to one of the characters set in the character recognition table T2 (YES at Step A16), the control section 1 performs the type-specific processing (character-specific processing) associated with the corresponding character (Step A17). For example, when the recognized character is "D", the review displayed image is deleted without being saved. When the recognized character is "S", "secret" is added as a file attribute. When the recognized character is "A", the save size of the image is changed to that for A3 printing. Then, after performing the character-specific processing in this way, the control section 1 deletes the image in the temporary storage folder TEMP as a processed image (Step A20) and returns to above-described Step A2. At Step A13, when judged that the duration time of the review display has elapsed (YES at Step A13), the control section 1 proceeds to Step A19, and copies the image temporarily stored in the temporary storage folder TEMP to the predetermined folder (ordinary folder) in the image storage section M2. Then, the control section 1 deletes the image in the temporary storage folder TEMP as a processed image (Step A20) and returns to above-described Step A2.

As described above, in the first embodiment, the control section 1 determines the type of a touch operation performed on the touch panel 8 during review display that is performed on the monitor screen for a predetermined amount of time after an image is captured by the imaging section 5, and performs the type-specific processing according to the determined type on the image being review displayed. Therefore, desired processing to be performed on an image can be specified by a touch operation, which is a simple and easy to understand operation, being performed immediately after the image is captured. As a result, the operability and the user-friendliness are improved. In addition, since the operation is performed immediately after imaging, the intentions of a user can be easily reflected, and there is no need for concern about unexpected processing when the touch panel 8 is inadvertently touched in another state.

Also, in the first embodiment, the operation for specifying the type of processing to be performed on a captured image is performed by a touch-panel operation during review display, rather than a menu selection operation after imaging and recording (menu selection operation immediately after imaging, touch-panel operation after imaging and recording, or the like). As a result, the following advantageous effects can be achieved.

In the latter operation (menu selection operation after imaging and recording), a user is required to perform an extra operation to specify an image to be processed or to access a menu screen for selecting the type of processing to be performed on a captured image. By contrast, in the former operation (touch panel operation during review display), a user is not required to perform an extra operation to specify an image to be processed or to access a menu screen for selecting the type of processing to be performed on a captured image. That is, by a user simply performing a touch operation during review display, the captured image being review displayed can automatically be recognized as a subject to be processed, and the contents of the touch panel operation can be automatically recognized as an operation instruction for selecting the type of processing to be performed on the image immediately after being captured (unstored image), from among various types of image processing.

Accordingly, when a touch panel operation is performed at timing other than during review display, the contents of this touch panel operation can be recognized as an operation for selecting other types of processing rather than the operation for selecting the type of processing to be performed on an image immediately after being captured (unstored image). Also, in a case where special processing is not required to be performed on an image immediately after being captured (unstored image), a user is not required to perform a touch panel operation during the review display and an operation specifying whether or not to perform special processing is not required, either. As a result, the delay of ordinary imaging and recording operations due to such processing does not occur. These advantageous effects are achieved by review display and a touch panel operation being combined, or in other words, a touch panel operation being adopted that allows an instruction to be quickly and easily given during the short and limited period of review display.

Also, in the first embodiment, the control section 1 performs the type-specific processing (direction-specific processing) based on the slide direction of a slide operation performed on the touch panel 8 as a touch operation. That is, only a slide operation, which is a simple and easy to understand operation, is required to be performed, and desired processing can be specified from among four types of processing based on simple slide operations in, for example, upward, downward, leftward, and rightward directions.

Moreover, when a handwritten character input operation is performed on the touch panel 8 as a touch operation, the control section 1 recognizes a handwritten character inputted by the character input operation and performs the type-specific processing (character-specific processing) based on the recognized character. Therefore, desired processing can be specified simply by an easy to understand operation to input a handwritten character, from among numerous processing associated with the types of characters.

Furthermore, if the type of a touch operation cannot be determined during review display, or in other words, if the type of a touch operation cannot be determined when the duration time of review display has elapsed, the control section 1 performs processing to store the image in an ordinary folder that stores images in the order of their captured date rather than storing the image in a classification-specific folder, as ordinary processing performed in place of the type-specific processing (direction-specific processing and character-specific processing). Therefore, images can be stored in the ordinary folder without a special operation being performed.

Still further, when the type-specific processing is performed after a captured image is stored in the temporary storage folder TEMP, the image in the temporary storage folder TEMP is deleted as a processed image. Therefore, various processing can be efficiently performed.

Yet still further, processing for sorting a captured image into a folder according to the type of the image is performed as the type-specific processing. Therefore, the operation for sorting a captured image into a folder can be efficiently performed by a simple operation.

Yet still further, renaming processing for a captured image is performed as the type-specific processing. Therefore, a file name can be efficiently added to a captured image by a simple operation.

Yet still further, processing for deleting a captured and stored image is performed as a part of the type-specific processing. Therefore, an image can be efficiently deleted by a simple operation.

Yet still further, processing for changing the save size of a captured image to be saved is performed as the type-specific processing. Therefore, the save size of an image can be efficiently changed by a simple operation.

Yet still further, processing for specifying the file attribute of a captured image is performed as the type-specific processing. Therefore, a file attribute can be efficiently specified by a simple operation.

In the above-described first embodiment, desired processing is specified from among four types of processing based on slide operations in upward, downward, leftward, and rightward directions. However, this desired processing may be specified from a total of eight types of processing by directions at 45 degree angles being included in addition to the upward, downward, leftward, and rightward directions. In addition, the slide directions are not limited to the upward, downward, leftward, and rightward directions and may be arbitrarily determined.

Also, in the above-described first embodiment, the direction of a slide operation serves as the type of touch operation during review display. However, a number of touch operations during a certain amount of time may be used as a type of touch operation. Further, a configuration may be adopted where a slide operation is performed which traces movement in the same direction while touching a plurality of points simultaneously with one or more fingers, etc. (i.e., a multi-touch slide operation), whereby the number of touched points (the number of fingers, etc.) may be detected as a number of multi-touches and used as a type of touch operation.

(Second Embodiment)

A second embodiment of the present invention will hereinafter be described with reference to FIG. 7 to FIG. 10.

In the above-described first embodiment, type-specific processing (direction-specific processing) based on a slide operation, and type-specific processing (character-specific processing) based on a handwritten character inputted by a handwritten character input operation are performed. However, in the second embodiment, type-specific processing is performed that is based on an operation performed by a photographer swinging a camera main body (housing) in a predetermined direction (housing moving operation). In addition, type-specific processing (character-specific processing) is performed that is based on a moving operation performed by a photographer writing a character by swinging a camera main body (housing), or in other words, based on a handwritten character inputted by a character input operation performed by the housing being moved. Note that sections that are basically the same or have the same name in both embodiments are given the same reference numerals, and therefore explanations thereof are omitted. Hereafter, the characteristic portions of the second embodiment will mainly be described.

Figure 7:
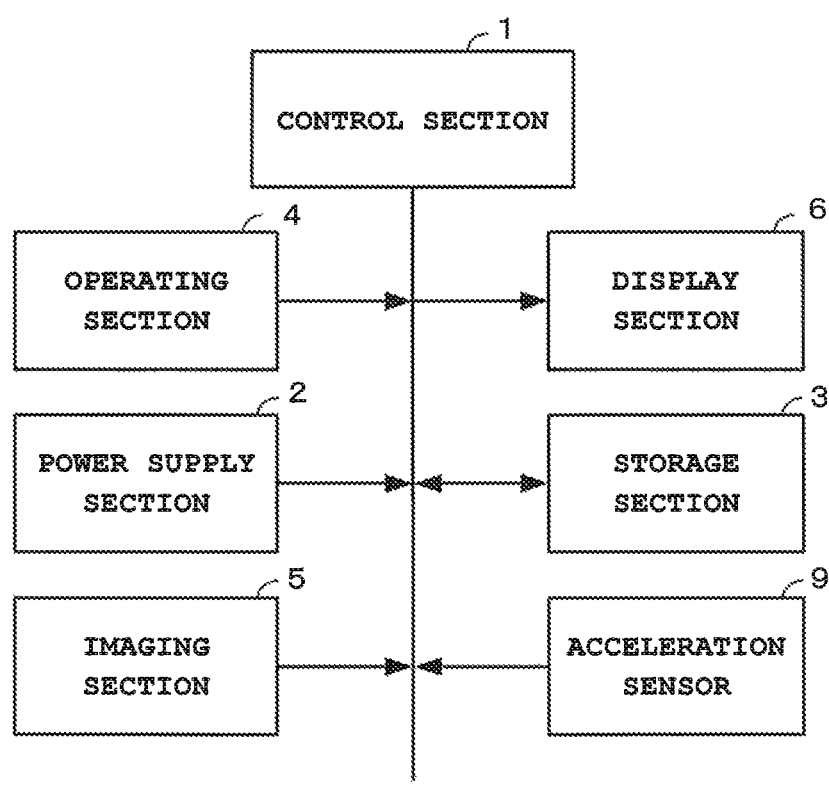
FIG. 7 is a block diagram showing basic components of a digital camera according to a second embodiment of the present invention.

FIG. 7 is a block diagram showing basic components of a digital camera according to the second embodiment of the invention.

The camera according to the second embodiment basically has the same structure as that in FIG. 1. The control section 1, which operates by receiving power supply from the power supply section (secondary battery) 2, controls the overall operations of the digital camera (hereinafter referred to as camera) in accordance with various programs stored in the storage section 3. In addition to the operating section 4, the imaging section 5 and the display section 6, an acceleration sensor 9 is connected to the control section 1 as a peripheral input and output device.

The acceleration sensor 9 is, for example, a three-axis acceleration sensor included in the camera main body (housing). This acceleration sensor 9 outputs a voltage value proportional to acceleration components in three axial directions (X, Y and Z directions) that are orthogonal to one another, or in other words, the magnitude of acceleration applied to the three axes. Acceleration in the direction of gravitational force (gravitational acceleration) is about 1G while the housing is standing still. During review display in which an image is continuously displayed for a predetermined amount of time after being captured by the imaging section 5, the control section 1 detects a direction (any one of upward, downward, leftward, and rightward directions) in which the housing is swung based on acceleration in each axial direction of the acceleration sensor 9. Also, the control section 1 identifies a two-dimensional plane (vertical plane) that is parallel in the direction of gravitational force based on the acceleration in each axial direction of the acceleration sensor 9, and performs character recognition based on the acceleration data separated into biaxial components that are orthogonal to the two-dimensional plane, or in other words, the acceleration data of a first component and the acceleration data of a second component.

Figure 8A:
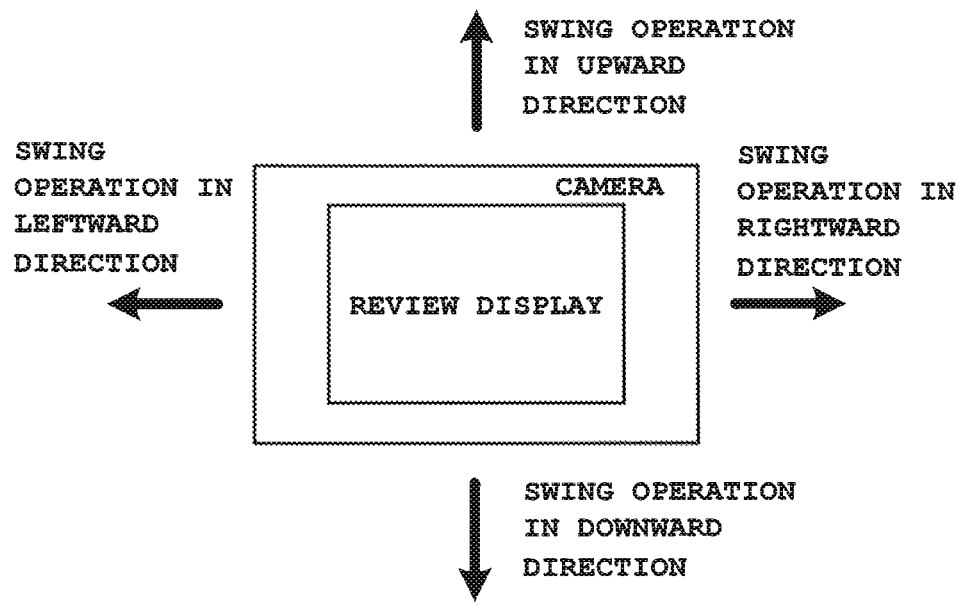
FIG. 8A is a diagram showing the types of moving operations in which the housing is swung.
Figure 8B:
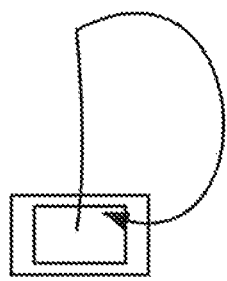
FIG. 8B is a diagram showing an example of a character input operation performed by the housing being moved.

FIG. 8A is a diagram for describing the types of moving operations to swing the housing in the imaging mode, in which an operation to move the housing (direction specifying operation) has been performed with a captured image being review displayed in the imaging mode. That is, FIG. 8A shows directions where a moving operation is performed (movement directions), in which a moving operation has been performed in the upward direction, the downward direction, the rightward direction, and the leftward direction. Moving operations in any of these directions are valid. FIG. 8B shows a character input operation in which a character is written by the housing being swung in the imaging mode (character input operation by housing movement). In the example, the letter "D" has been inputted.

The imaging mode direction table T1 according to the second embodiment has the same configuration as that in FIG. 3, and the playback mode direction table T3 according to the second embodiment has the same configuration as that in FIG. 4B. However, "direction" in the second embodiment refers to a movement direction when a moving operation (direction specifying operation) in which the housing is swung in a predetermined direction is performed. Other aspects are the same as those of the first embodiment. Also, the imaging mode handwritten character recognition table T2 according to the second embodiment has the same configuration as that in FIG. 4A. However, "recognized character" in the second embodiment refers to a result of the recognition of a handwritten character inputted by a moving operation in which a character is written by the housing being swung, or in other words, a result of the recognition of a handwritten character inputted by a character input operation (character input operation by housing movement). Other aspects are the same as those of the first embodiment.

Figure 10:
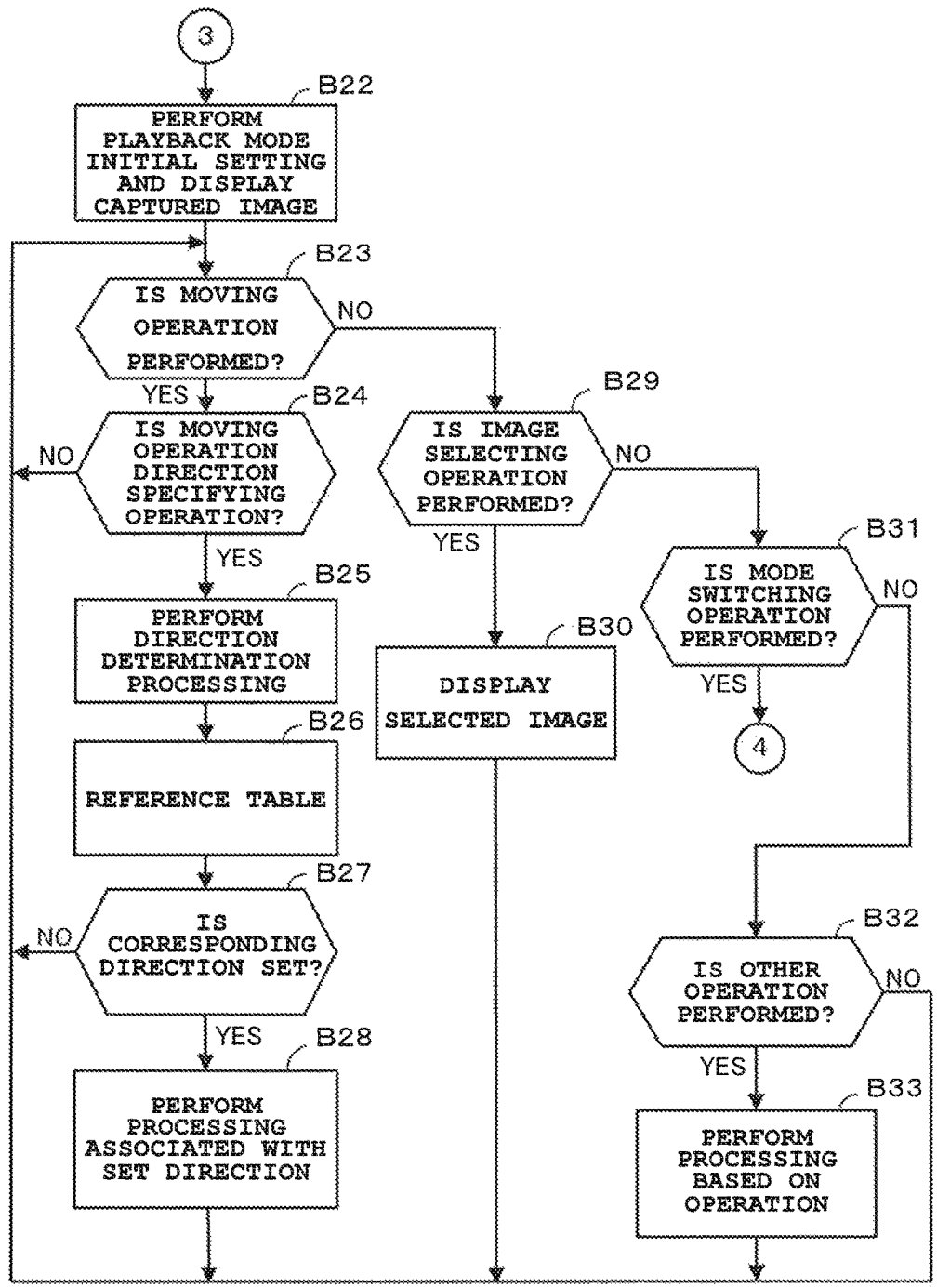
FIG. 10 is a flowchart of operations following those in FIG. 9.

FIG. 9 and FIG. 10 are flowcharts of the overall operation of the camera which is started when power is turned ON (flowcharts outlining operations of the characteristic portion of the second embodiment). Note that descriptions of the steps in FIG. 9 and FIG. 10 that are basically the same as those in FIG. 5 and FIG. 6 for the first embodiment are simplified.

First, when the current mode is not the imaging mode (NO at Step B1 in FIG. 9), the control section 1 proceeds to the flow in FIG. 10, and performs initial setting for the playback mode and processing to display an image to be replayed on the display section 6 (Step B22). Then, in the playback mode, when an operation to move the housing is detected based on acceleration in each axial direction of the acceleration sensor 9 (YES at Step B23), the control section 1 judges whether or not this moving operation is a direction specifying operation (Step B24).

When judged that the moving operation is not a direction specifying operation (NO at Step B24), the control section 1 returns to Step B23. Conversely, when judged that the moving operation is a direction specifying operation (YES at Step B24), the control section 1 determines the movement direction thereof (Step B25) and references the playback direction table T3 based on the determined movement direction (Step B26). As a result, if a corresponding direction has been set in the table T3 (YES at Step B27), the control section 1 performs the direction-specific processing associated with the corresponding direction (Step B28). Also, when an operation for selecting an image to be replayed is performed (YES at Step B29), the control section 1 displays the selected image on the display section 6 (Step B30). When another operation is performed (YES at Step B32), the control section 1 performs processing based on this operation (Step B33). Then, the control section 1 returns to Step B23.

When the mode switching button K1 is operated (YES at Step B31), the control section 1 proceeds to the flow in FIG. 9 and performs processing in the imaging mode. First, the control section 1 performs initial setting for the imaging mode and displays a live-view image on the display section 6 (Step 32). Here, when the mode switching button K1 is operated (YES at Step B4), the control section 1 proceeds to the above-described processing in the playback mode. When another operation is performed (YES at Step 35), the control section 1 performs processing based on this operation (Step 36), and then returns to Step B2. When the release button K2 is operated (YES at Step B3), the control section 1 performs AF processing, AE processing, and AWB processing (Step B7), and after setting imaging conditions, performs imaging processing (Step 38). Then, the control section 1 stores a captured image in the temporary storage folder TEMP (Step B9) and starts the review display of the image (Step 310).

During the review display, the control section 1 judges whether or not an operation to move the housing has been performed (Step B11), and whether or not the duration time of the review display has elapsed (Step B12). Here, when an operation to move the housing is detected based on acceleration in each axial direction of the acceleration sensor 9 (YES at Step B11), and this moving operation is a direction specifying operation, or in other words, the movement direction is a certain direction (YES at Step B13), the control section 1 determines the movement direction (Step B14). Then, the control section 1 references the imaging mode direction table T1 based on the determined movement direction (Step B15), and judges whether or not a corresponding direction has been set in the table T1 (Step B16). When judged that a corresponding direction has not been set (NO at Step B16), the control section 1 proceeds to Step B20 and copies the image temporarily stored in the temporary storage folder TEMP to the predetermined folder (ordinary folder) in the image storage section M2. Then, the control section 1 deletes the image in the temporary storage folder TEMP (Step B21) and returns to above-described Step B2.

At Step B16, when the movement direction corresponds to one of the upward, downward, leftward, and rightward directions (YES at Step B16), the control section 1 performs the type-specific processing (direction-specific processing) associated with the corresponding direction (Step B17). Then, the control section 1 deletes the image in the temporary storage folder TEMP (Step B21) and returns to above-described Step B2. Also, when the moving operation is a character input operation in which a character is written by the housing being swung (YES at Step B18), the control section 1 recognizes a handwritten character inputted by the character input operation (Step B19) and references the imaging mode handwritten character recognition table T2 based on the recognized character (Step B15).

Then, when the recognized character does not correspond to any of the characters set in the table T2 (NO at Step B16), the control section 1 proceeds to Step B20. When the recognized character corresponds to one of the characters (YES at Step B16), the control section 1 performs the type-specific processing (character-specific processing) associated with the corresponding character (Step B17). Then, the control section 1 deletes the temporarily stored image as a processed image (Step B21) and returns to above-described Step B2. At Step B12, when judged that the duration time of the review display has elapsed (YES at Step B12), the control section 1 proceeds to Step B20, and after copying the temporarily stored image to the predetermined folder (ordinary folder), deletes the temporarily stored image (Step B21), and returns to above-described Step B2.

As described above, in the second embodiment, the control section 1 determines the type of a moving operation in which the housing is swung during review display and performs the type-specific processing according to the determined type on the image being review displayed. Therefore, by a simple and easy to understand operation in which the housing is swung immediately after an image is captured, desired processing to be performed on the image can be specified. As a result, the operability and the user-friendliness are improved. In addition, since the operation is performed immediately after imaging, the intentions of a user can be easily reflected, and there is no need for concern about unexpected processing when the housing is inadvertently moved in another state.

Accordingly, in the second embodiment, a user is not required to perform an extra operation to specify an image to be processed or to access a menu screen for selecting the type of processing to be performed on a captured image, as in the case of the first embodiment. That is, by a user simply performing an operation to move the housing during review display, the captured image being review displayed can automatically be recognized as a subject to be processed, and the contents of the moving operation can be automatically recognized as an operation instruction for selecting the type of processing to be performed on the image immediately after being captured (unstored image), from among various types of image processing.

Moreover, when a moving operation in which the housing is swung (direction specifying operation) is performed, the control section 1 performs the type-specific processing (direction-specific processing) based on the movement direction. That is, only a simple and easy to understand operation to change the direction in which the housing is swung is required to be performed, and desired processing can be specified from among four types of processing based on simple moving operations in, for example, upward, downward, leftward, and rightward directions.

Furthermore, when a character input operation is performed in which a character is written by the housing being swung, the control section 1 recognizes a handwritten character inputted by the character input operation, determines the recognized character as the type of the operation, and performs the type-specific processing (character-specific processing) based on the recognized character. Therefore, by an easy to understand operation in which a handwritten character is inputted by the housing being swung, desired processing operation can be specified from among numerous processing associated with the types of characters.

Still further, if the type of a housing moving operation cannot be determined during review display, or in other words, if the type of a housing moving operation cannot be determined when the duration time of review display has elapsed, the control section 1 performs processing to store the image in an ordinary folder that stores images in the order of their captured date rather than storing the image in a classification-specific folder, as ordinary processing performed in place of the type-specific processing (direction-specific processing and character-specific processing). Therefore, images can be stored in the ordinary folder without a special operation being performed.

Yet still further, other advantageous effects that are the same as those of the first embodiment are also achieved in the second embodiment.

In the above-described second embodiment, desired processing is specified from among four types of processing, based on operations in which the housing is swung in upward, downward, leftward, and rightward directions. However, this desired processing may be specified from a total of eight types of processing by directions at 45 degree angles being included in addition to the upward, downward, leftward, and rightward directions. In addition, the directions in which the housing is swung are not limited to the upward, downward, leftward, and rightward directions, and may be arbitrarily determined. Moreover, the number of times the housing is swung during a certain amount of time may also be used.

(Third Embodiment)

A third embodiment of the present invention will hereinafter be described with reference to FIG. 11 to FIG. 15.

In the above-described first embodiment, type-specific processing based on a slide operation, and type-specific processing based on a handwritten character inputted by a handwritten character input operation are performed. However, in the third embodiment, type-specific processing based on the movement of a subject is performed. Specifically, type-specific processing is performed that is based on the movement of a subject when, while a captured image is being continuously review displayed for a predetermined amount of time in the imaging mode, the photographer moves his or her hand (subject) in front of the imaging section 5 (in front of the imaging lens), or the imaging area is changed by the photographer swinging the camera main body (housing) and thereby gives an appearance that the subject has moved. Note that sections that are basically the same or have the same name in both embodiments are given the same reference numerals, and therefore explanations thereof are omitted. Hereafter, the characteristic portions of the third embodiment will mainly be described.

Figure 11:
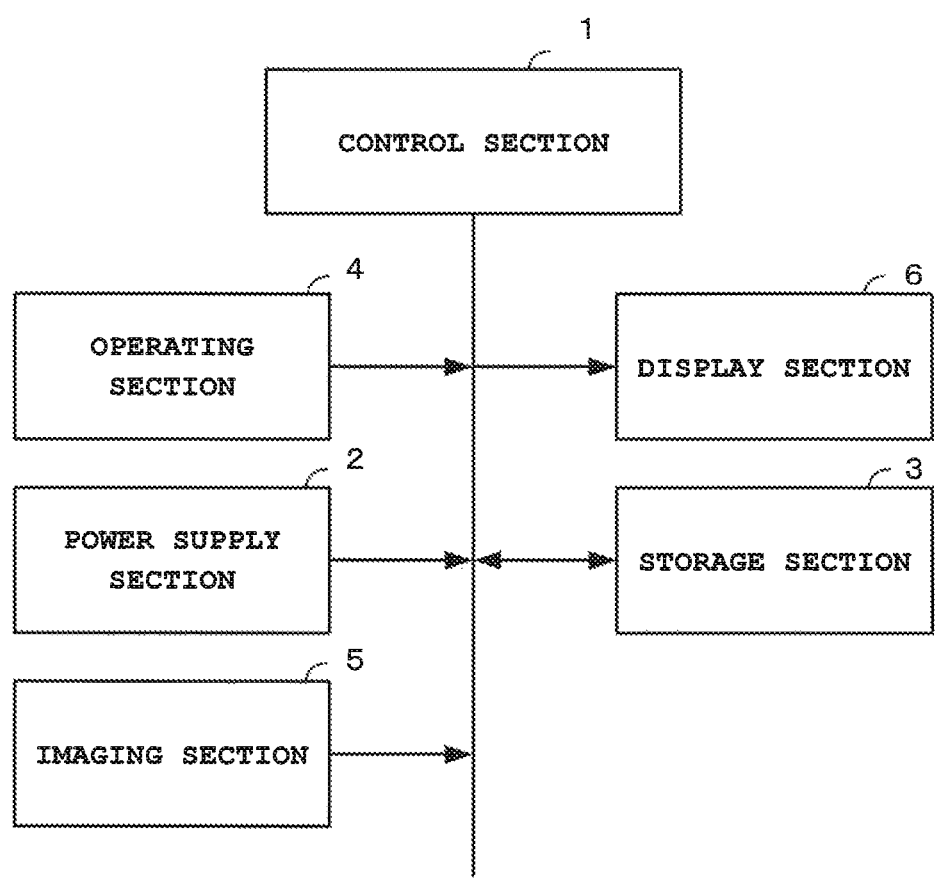
FIG. 11 is a block diagram showing basic components of a digital camera according to a third embodiment of the present invention.

FIG. 11 is a block diagram showing basic components of a digital camera applied according to the third embodiment of the invention.

The camera according to the third embodiment basically has the same structure as that in FIG. 1. The control section 1, which operates by receiving power supply from the power supply section (secondary battery) 2, controls the overall operations of the digital camera (hereinafter referred as camera) in accordance with various programs stored in the storage section 3. The operating section 4, the imaging section 5, and the display section 6, are connected to this control section 1, as a peripheral input and output device.

FIG. 12A shows the types of moving operations (direction specifying operations) in predetermined directions, in which a moving operation where the photographer moves his or her hand (subject) in front of the imaging section 5 (in front of the imaging lens) has been performed. The examples in FIG. 12A indicate the directions of moving operations in which the photographer moves his or her hand (subject) while a captured image is being review displayed. In these examples, a moving operation in which the photographer's hand is swung in the rightward direction, a moving operation in which the photographer's hand is swung in the leftward direction, a moving operation in which the photographer's hand is swung in the upward direction, and a moving operation in which the photographer's hand is swung in the downward direction have been described. Moving operations in any of these directions are valid. When the control section 1 acquires an image from the imaging section 5 during review display and judges that a subject moving operation has been performed by analyzing the acquired image, the type of the moving operation (direction) is determined and the type-specific processing (direction-specific processing) based on the type of the moving operation is performed on the image being review displayed.

FIG. 12B shows a character input operation in which a character is written by the photographer moving his or her hand (subject) in front of the imaging section 5 in the imaging mode (character input operation by subject movement). In the example, the letter "D" has been inputted. When the control section 1 acquires an image from the imaging section 5 during review display, judges that a subject moving operation has been performed by analyzing the acquired image, and determines that the moving operation is a character input operation in which a character is written, a handwritten character inputted by the character input operation is recognized and the type-specific processing (character-specific processing) based on the recognized character is performed on the image being review displayed.

Figure 13A:
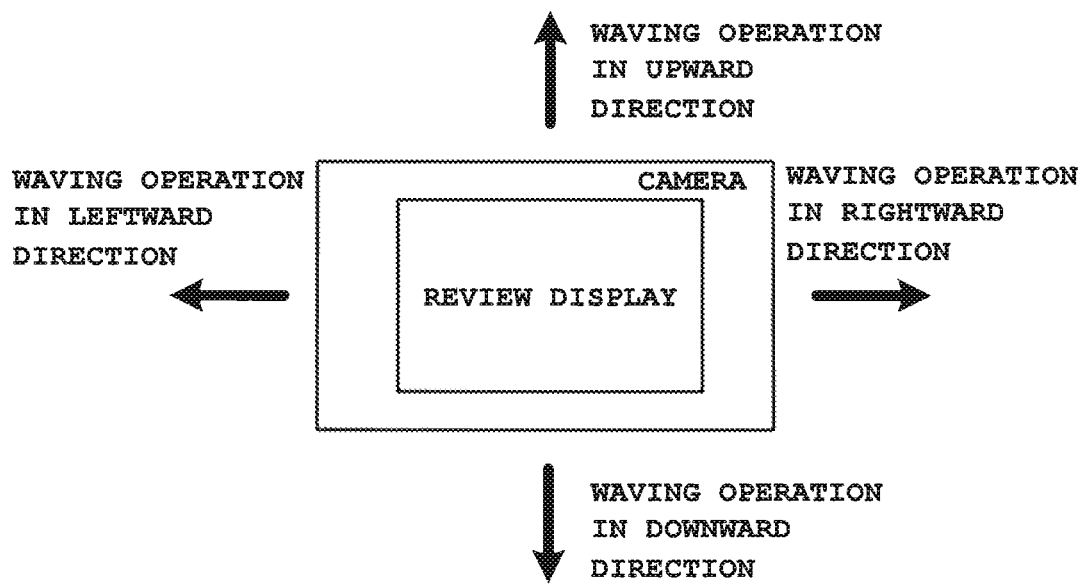
FIG. 13A is a diagram showing the types of operations to move a subject in which the imaging area is changed by an operation to swing the housing and thereby gives an appearance that the subject has moved.

FIG. 13A shows a state in which an imaging area has been changed by the photographer swinging the camera main body (housing) and thereby giving an appearance that the subject has moved. The example in FIG. 13A indicates the directions of moving operations (movement directions) when the housing is swung (subject is moved) while a captured image is being review displayed. In this example, a moving operation in which the housing is swung in the upward direction (operation in which a photographic subject is moved in the downward direction), a moving operation in which the housing is swung in the downward direction (operation in which a photographic subject is moved in the upward direction), a moving operation in which the housing is swung in the rightward direction (operation in which a photographic subject is moved in the leftward direction), and a moving operation in which the housing is swung in the leftward direction (operation in which a photographic subject is moved in the rightward direction) have been described. Moving operations in any of these directions are valid. When a subject moving operation is performed during review display, the control section 1 determines the type of the moving operation (direction) and performs the type-specific processing (direction-specific processing) based on the type of the moving operation on the image being review displayed.

Figure 13B:
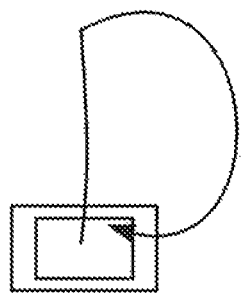
FIG. 13B is a diagram showing an example of a character input operation performed by the housing being moved (by the subject being moved)

FIG. 13B shows a character input operation in which a character is written by the housing being swung (subject being moved) in the imaging mode (character input operation by subject movement), as in the case of the second embodiment. In the third embodiment, the acceleration sensor 9 shown in the second embodiment is not provided. The movement of a subject is detected by the analysis of a captured image, and a handwritten character is recognized based on the detection result. In the example, the letter "D" has been inputted. When a character input operation by the movement of a photographic subject is performed during review display, the control section 1 recognizes a handwritten character inputted by the character input operation and performs the type-specific processing (character-specific processing) based on the recognized character on the image being review displayed.

The imaging mode direction table T1 according to the third embodiment has the same configuration as that in FIG. 3, and the playback mode direction table T3 according to the third embodiment has the same configuration as that in FIG. 4B. However, "direction" in the third embodiment refers to a movement direction when an operation to move a photographic subject (direction specifying operation) is performed. Other aspects are the same as those of the first embodiment. Also, the imaging mode handwritten character recognition table T2 according to the third embodiment has the same configuration as that in FIG. 4A. However, "recognized character" in the third embodiment refers to a result of the recognition of a handwritten character inputted by a character input operation in which a character is written by the movement of a photographic subject (character input operation by subject movement). Other aspects are the same as those of the first embodiment.

Figure 15:
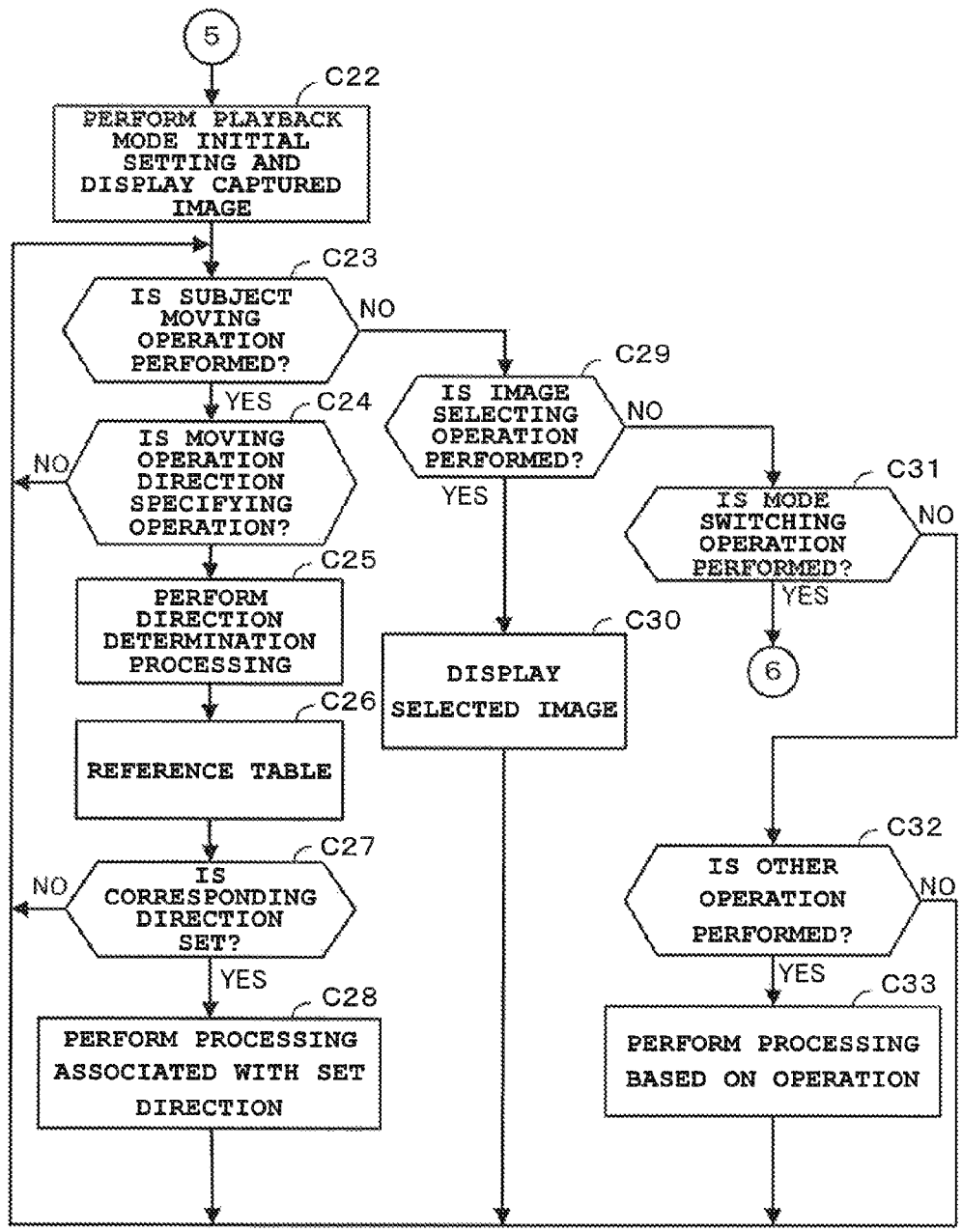
FIG. 15 is a flowchart of operations following those in FIG. 14.

FIG. 14 and FIG. 15 are flowcharts of the overall operation of the camera which is started when power is turned ON (flowcharts outlining operations of the characteristic portion of the third embodiment). Note that descriptions of the steps in FIG. 14 and FIG. 15 that are basically the same as those in FIG. 5 and FIG. 6 for the first embodiment are simplified.

First, when the current mode is not the imaging mode (NO at Step C1 in FIG. 14), the control section 1 proceeds to the flow in FIG. 15, and performs initial setting for the playback mode and processing to display an image to be replayed on the display section 6 (Step C22). In the playback mode, the control section 1 judges whether or not an operation to move a subject has been performed by acquiring an image from the imaging section 5 and analyzing the acquired image (Step C23). When an operation to move a subject is detected (YES at Step C23), the control section 1 judges whether or not this moving operation is a direction specifying operation (Step C24).

When judged that the moving operation is not a direction specifying operation (NO at Step C24), the control section 1 returns to above-described Step C23. Conversely, when judged that the moving operation is a direction specifying operation (YES at Step C24), the control section 1 determines the movement direction thereof (Step C25) and references the playback direction table T3 based on the determined movement direction (Step C26). As a result, if a corresponding direction has not been set in the playback direction table T3 (NO at Step C27), the control section 1 returns to Step C23. Conversely, when a corresponding direction has been set in the playback direction table T3 (YES at Step C27), the control section 1 performs processing associated with the corresponding direction (Step C28) and returns to Step C23. Also, when an operation for selecting an image to be replayed is performed (YES at Step C29), the control section 1 displays the selected image on the display section 6 (Step C30) and returns to Step C23. When another operation is performed (YES at Step C32), the control section 1 performs processing based on this operation (Step C33) and returns to Step C23.

When the mode switching button K1 is operated (YES at Step C31), the control section 1 proceeds to the flow in FIG. 14 and performs processing in the imaging mode. First, the control section 1 performs initial setting for the imaging mode and displays a live-view image on the display section 6 (Step C2). Here, when the mode switching button K1 is operated (YES at Step C4), the control section 1 proceeds to the above-described processing in the playback mode. When another operation is performed (YES at Step C5), the control section 1 performs processing based on this operation (Step C6), and then returns to above-described Step C2.

When the release button K2 is operated (YES at Step C3), the control section 1 performs AF processing, AE processing, and AWB processing (Step C7), and after setting imaging conditions, performs imaging processing (Step C8). Then, the control section 1 temporarily stores a captured image in the temporary storage folder TEMP (Step C9) and starts the review display of the image (Step C10). During the review display, the control section 1 acquires an image from the imaging section 5 and judges whether or not an operation to move the subject has been performed by analyzing the acquired image (Step C11), and whether or not the duration time of the review display has elapsed (Step C12).

When judged that an operation to move the subject has been performed (YES at Step C11), and this moving operation is a direction specifying operation (YES at Step C13), the control section 1 determines the movement direction thereof (Step C14) and references the imaging mode direction table T1 based on the determined movement direction (Step C15). Then, if a corresponding direction has not been set in the table T1 (NO at Step C16), the control section 1 proceeds to Step C20 and copies the image temporarily stored in the temporary storage folder TEMP to the predetermined folder (ordinary folder) in the image storage section M2 as ordinary processing performed in place of the type-specific processing. Then, the control section 1 deletes the image in the temporary storage folder TEMP (Step C21) and returns to above-described Step C2.

At Step C16, when the movement direction corresponds to one of the upward, downward, leftward, and rightward directions (YES at Step C16), the control section 1 performs the direction-specific processing associated with the corresponding direction (Step C17), and deletes the temporarily stored image (Step C21). Also, when the subject moving operation is a character input operation in which a character is written (YES at Step C18), the control section 1 recognizes a handwritten character inputted by the character input operation (Step C19). Then, the control section 1 references the imaging mode handwritten character recognition table T2 based on the recognized character (Step C15) and judges whether or not the recognized character corresponds to any one of the characters set in the table T2 (Step C16). When judged that the recognized character does not correspond to any of the characters (NO at Step C16), the control section 1 proceeds to Step C20. On the other hand, when judged that the recognized character corresponds to one of the characters (YES at Step C16), the control section 1 performs processing (character-specific processing) associated with the corresponding character (Step C17). Then, the control section 1 deletes the temporarily stored image (Step C21). At Step C12, when judged that the duration time of the review display has elapsed (YES at Step C12), the control section 1 proceeds to Step B20, and after copying the temporarily stored image to the predetermined folder (ordinary folder), deletes the temporarily stored image (Step C21).

As described above, in the third embodiment, the control section 1 determines the type of a subject moving operation during review display, and performs the type-specific processing according to the determined type on the image being review displayed. Therefore, by a simple and easy to understand operation to move a photographic subject immediately after the image is captured, desired processing to be performed on the image can be specified. As a result, the operability and the user-friendliness are improved. In addition, since the operation is performed immediately after imaging, the intentions of a user can be easily reflected, and there is no need for concern about unexpected processing when a photographic subject is inadvertently moved in another state.

Accordingly, in the third embodiment, a user is not required to perform an extra operation to specify an image to be processed or to access a menu screen for selecting the type of processing to be performed on a captured image, as in the case of the first embodiment. That is, by a user simply performing an operation to move a photographic subject during review display, the captured image being review displayed can automatically be recognized as a subject to be processed, and the contents of the moving operation can be automatically recognized as an operation instruction for selecting the type of processing to be performed on the image immediately after being captured (unstored image), from among various types of image processing.

Moreover, when a photographic subject is moved in a predetermined direction, the control section 1 determines the movement direction as the type of the movement operation, and performs the type-specific processing (direction-specific processing) based on the movement direction. That is, only a simple and easy to understand operation to change the direction in which the housing is swung is required to be performed, and desired processing can be specified from among four types of processing based on simple moving operations in, for example, upward, downward, leftward, and rightward directions.

Furthermore, when an operation to move a photographic subject is a character input operation to write a character, the control section 1 recognizes a handwritten character inputted by the character input operation, determines the recognized character as the type of the operation, and performs the type-specific processing (character-specific processing) based on the recognized character. Therefore, by an easy to understand operation in which a handwritten character is inputted by a photographic subject being moved, desired processing operation can be specified from among numerous processing associated with the types of characters.

Still further, if the type of a subject moving operation cannot be determined during review display, or in other words, if the type of a housing moving operation cannot be determined when the duration time of review display has elapsed, the control section 1 performs processing to store the image in an ordinary folder that stores images in the order of their captured date rather than storing the image in a classification-specific folder, as ordinary processing performed in place of the type-specific processing. Therefore, images can be stored in the ordinary folder without a special operation being performed.

Yet still further, other advantageous effects that are the same as those of the first embodiment are also achieved in the third embodiment.

In the above-described third embodiment, desired processing is specified from among four types of processing, based on operations to move a photographic subject in upward, downward, leftward, and rightward directions. However, this desired processing may be specified from a total of eight types of processing by directions at 45 degree angles being included in addition to the upward, downward, leftward, and rightward directions. In addition, the directions in which a photographic subject is moved are not limited to the upward, downward, leftward, and rightward directions, and may be arbitrarily determined. Moreover, the number of times a photographic subject is moved during a certain amount of time may also be used.

Also, in the examples of the above-described embodiments, still image shooting has been performed. However, the present invention can be similarly applied to instances where video shooting is performed. In these instances, the above-described moving operation may be performed not only during review display after a moving image is captured but also while the moving image is being captured. In the case where the moving operation is performed while the moving image is being captured, the moving image may be stored to a specified folder after the moving image is captured.

Moreover, in the above-described embodiments, the present invention has been applied to a digital camera (compact camera). However, the present invention is not limited thereto and may be applied to, for example, a personal computer, a Personal Digital Assistant (PDA), or a music player having a camera function.

Furthermore, the "devices" or the "sections" described in the above-described embodiments are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An imaging device comprising:
   a monitor screen;
   a touch panel provided on the monitor screen;
   an imaging section; and
   a CPU configured to perform functions comprising:
   acquiring, as a subject to be saved, an image captured by the imaging section in response to an imaging instruction operation;
   performing review display, the review display comprising processing for, before processing related to saving is performed on the image acquired as the subject to be saved, automatically displaying the image on the monitor screen continuously for a predetermined amount of time;
   in response to a touch operation performed at an arbitrary position on the touch panel, determining a type of the touch operation, the touch operation being performed on the touch panel while the review display is being performed and before the processing related to saving is performed, and a start position of the touch operation being independent of a position of contents being displayed on the monitor screen while the review display is being performed;

identifying type-specific processing to be performed when performing the processing related to saving on the image for which the review display is being performed, the type-specific processing being identified before the processing related to saving is performed, and the type-specific processing being identified according to the type of the touch operation determined by the determining; and performing the type-specific processing related to saving identified by the identifying on the image for which the review display is being performed before the processing related to saving is performed.

2. The imaging device according to claim 1, wherein the determining determines, when a slide operation is performed as the touch operation on the touch panel, a slide direction of the slide operation as the type of the touch operation; and wherein the CPU is configured to perform direction-specific processing based on the slide direction determined by the determining as the type-specific processing.

3. The imaging device according to claim 1, wherein:

the CPU is further configured to perform a function of recognizing, when a handwritten character input operation is performed as the touch operation on the touch panel, a handwritten character inputted by the handwritten character input operation, the determining determines the handwritten character recognized by the recognizing as the type of the touch operation, and the CPU is configured to perform character-specific processing based on the handwritten character recognized by the recognizing as the type-specific processing.

4. The imaging device according to claim 1, wherein the CPU is configured to perform ordinary processing instead of the type-specific processing on the image for which the review display is being performed, when the determining cannot determine the type of the touch operation during the performing of the review display.

5. The imaging device according to claim 1, wherein, when the type-specific processing is performed after the image captured by the imaging section is temporarily stored in a temporary storage folder so as to perform the review display, the CPU deletes the image in the temporary storage folder as a processed image.

6. The imaging device according to claim 1, wherein the CPU is configured to perform processing for sorting the image captured by the imaging section into a folder corresponding to a type of the image as the type-specific processing.

7. The imaging device according to claim 1, wherein the CPU is configured to perform processing for renaming the image captured by the imaging section as the type-specific processing.

8. The imaging device according to claim 1, wherein the CPU is configured to perform processing for deleting the image captured by the imaging section and temporarily stored as a part of the type-specific processing.

9. The imaging device according to claim 1, wherein the CPU is configured to perform processing for changing a save size of the image when the image captured by the imaging section is saved as the type-specific processing.

10. The imaging device according to claim 1, wherein the CPU is configured to perform processing for specifying a file attribute of the image captured by the imaging section as the type-specific processing.

11. The imaging device according to claim 1, wherein the CPU is further configured to:

perform imaging processing on the image acquired as the subject to be saved; and temporarily store the image which has been acquired as the subject to be saved and for which the imaging processing has been performed, and thereafter, to identify the type-specific processing to be performed when performing the processing related to saving and to perform the type-specific processing identified by the identifying.

12. An imaging method for an imaging device, the method comprising:

acquiring a captured image as a subject to be saved, in response to an imaging instruction operation;

performing review display, the review display comprising processing for, before processing related to saving is performed on the image acquired as the subject to be saved, automatically displaying the image on a monitor screen continuously for a predetermined amount of time;

in response to a touch operation performed at an arbitrary position on a touch panel provided on the monitor screen, determining a type of the touch operation, the touch operation being performed on the touch panel while the review display is being performed and before the processing related to saving is performed, and a start position of the touch operation being independent of a position of contents being displayed on the monitor screen while the review display is being performed;

identifying type-specific processing to be performed when performing the processing related to saving on the image for which the review display is being performed, the type-specific processing being identified before the processing related to saving is performed, and the type-specific processing being identified according to the type of the touch operation determined by the determining; and performing the type-specific processing related to saving identified by the identifying on the image for which the review display is being performed before the processing related to saving is performed.

13. A non-transitory computer-readable storage medium having stored thereon a program that is executable by a computer, the program being executable by the computer to perform functions comprising:

acquiring a captured image as a subject to be saved, in response to an imaging instruction operation;

performing review display, the review display comprising processing for, before processing related to saving is performed on the image acquired as the subject to be saved, automatically displaying the image on a monitor screen continuously for a predetermined amount of time;

in response to a touch operation performed at an arbitrary position on a touch panel provided on the monitor screen, determining a type of the touch operation, the touch operation being performed on the touch panel while the review display is being performed and before the processing related to saving is performed, and a start position of the touch operation being independent of a position of contents being displayed on the monitor screen while the review display is being performed;

identifying type-specific processing to be performed when performing the processing related to saving on the image for which the review display is being performed, the type-specific processing being identified before the processing related to saving is performed, and the type-specific processing being identified based on the type of the touch operation determined by the determining; and performing the type-specific processing related to saving identified by the identifying on the image for which the review display is being performed before the processing related to saving is performed.

\* \* \* \* \*

UNITED STATES PATENT AND TRADEMARK OFFICE
CERTIFICATE OF CORRECTION

PATENT NO. : 9,621,790 B2  
APPLICATION NO. : 13/735520  
DATED : April 11, 2017  
INVENTOR(S) : Daisuke Otani Page 1 of 1

It is certified that error appears in the above-identified patent and that said Letters Patent is hereby corrected as shown below:

In the Specification

Column 1, Line 9, delete "2011-006110" and insert --2012-006110--.

Signed and Sealed this  
Twenty-seventh Day of June, 2017

Joseph Matal  
*Performing the Functions and Duties of the*  
*Under Secretary of Commerce for Intellectual Property and*  
*Director of the United States Patent and Trademark Office*